United States Patent [19]

Ungarelli et al.

[11] Patent Number: 5,410,039
[45] Date of Patent: Apr. 25, 1995

[54] PROCESS FOR THE SYNTHESIS OF GLYCOSAMINOGLYCANS CONTAINING α-L-GALACTURONIC ACID SUBSTITUTED WITH NUCLEOPHILIC GROUPS IN POSITION 3

[75] Inventors: Fabrizio Ungarelli; Silvano Piani, both of Bologna, Italy

[73] Assignee: Alfa Wassermann S.p.A., Alanno, Italy

[21] Appl. No.: 207,140

[22] Filed: Mar. 7, 1994

[30] Foreign Application Priority Data

Mar. 29, 1993 [IT] Italy ................. BO93A0126

[51] Int. Cl.$^6$ ............................................. C08B 37/00
[52] U.S. Cl. ...................... 536/124; 536/21; 530/322; 530/345
[58] Field of Search ............... 514/8, 56; 536/21, 124; 530/322, 345

[56] References Cited

U.S. PATENT DOCUMENTS

| | | | |
|---|---|---|---|
| 4,987,223 | 1/1991 | Choay et al. | 536/17.7 |
| 5,010,063 | 4/1991 | Piani et al. | 514/56 |
| 5,104,860 | 4/1992 | Piani et al. | 514/56 |

FOREIGN PATENT DOCUMENTS

| | | |
|---|---|---|
| 0347588 | 12/1989 | European Pat. Off. |
| 0380943 | 8/1990 | European Pat. Off. |

OTHER PUBLICATIONS

Gallagher J. T., Walker A. Molecular distinctions between heparan sulphate and heparin. Analysis of sulphation patterns indicates that heparan sulphate and heparin are separate families of N-sulphated polysaccharides. Biochem. J. 1985:230:665–74.

Turnbull, J. E., Gallagher J. T. Distribution of iduronate 2-sulphate residues in heparan sulphate. Evidence for an ordered polymeric structure. Biochem. J. 1991:273:553–559.

Lindahl U., Kjellen L. Heparin or Heparan Sulfate –What is the Difference? Thrombosis and Haemostasis–F. K. Schattauer Verlags-gesellschaft mbH(Stuttgart) 66(1)44–36 (1991).

Jaseja et al. Can. J. Chem. 1989, 67, 1449–1456.

Primary Examiner—Douglas W. Robinson
Assistant Examiner—Kathleen Kahler Fonda
Attorney, Agent, or Firm—Bucknam and Archer

[57] ABSTRACT

A process for the synthesis of glycosaminoglycans in which one of the α-L-iduronic-2-O-sulfate acid saccharide units, which is characteristic of glycosaminoglycans with heparin or heparan structure, has undergone a structural modification, entirely or in part, with transformation into α-L-galacturonic acid substituted in position 3 with nucleophilic groups, is described. The process is carried out by treating glycosaminoglycans having heparin or heparan structure with a nucleophilic reagent in alkaline solution.

8 Claims, No Drawings.

PROCESS FOR THE SYNTHESIS OF GLYCOSAMINOGLYCANS CONTAINING α-L-GALACTURONIC ACID SUBSTITUTED WITH NUCLEOPHILIC GROUPS IN POSITION 3

SUMMARY OF THE INVENTION

A process for the synthesis of semi-synthetic glycosaminoglycans of general formula III

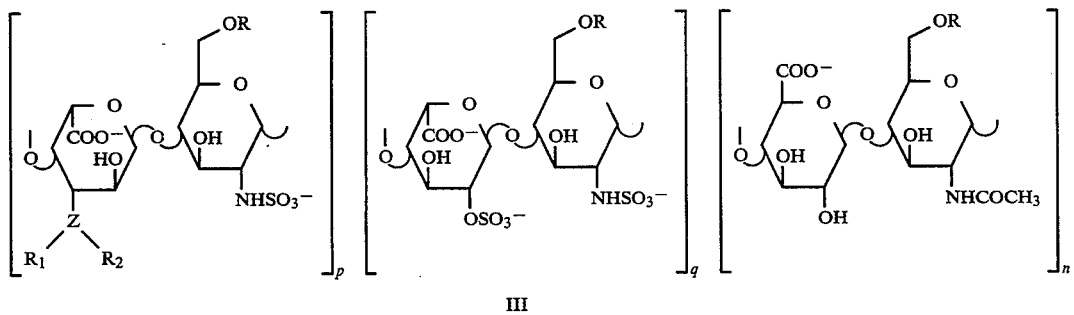

III is described in which one of the saccharide units characteristic of glycosaminoglycans with heparin or heparan structure, more specifically that of α-L-iduronic-2-O-sulfate acid, has undergone a structural modification, entirely or in part, with transformation into α-L-galacturonic acid substituted in position 3 with nucleophilic radicals of general formula II

II

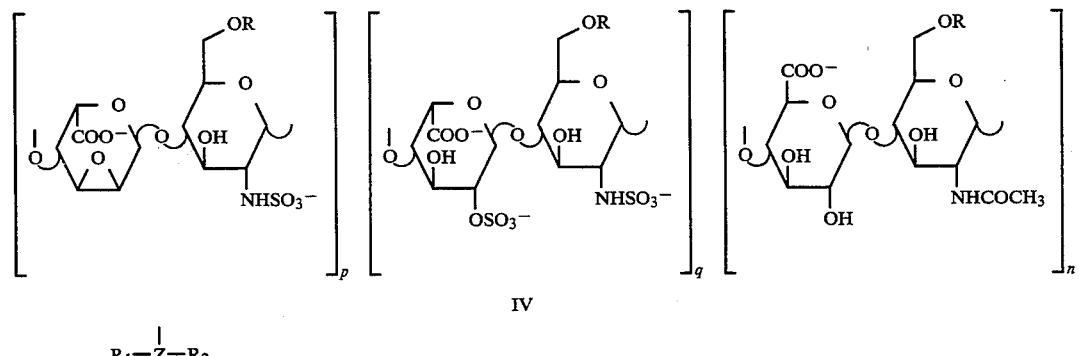

IV

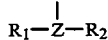

Said process is carried out by treating glycosaminoglycans with heparin or heparan structure by means of a nucleophilic reagent in alkaline medium.

BACKGROUND OF THE INVENTION

In U.S. Pat. No. 5,010,063 a description was given of a structural modification, in basic medium, of glycosaminoglycans with heparin and heparan structure with subsequent isolation from the reaction mixture of new derivatives with respect to the state of the art, as demonstrated unmistakably by the chemical and physical characteristics and especially by the $^{13}$C-NMR spectrum.

In the subsequent U.S. Pat. No. 5,104,860 a further structural modification was described, in a basic or neutral medium, which, starting from the products formed in the reaction conditions described in U.S. Pat. No. 5,010,063, and from the glycosaminoglycans with heparin or heparan structure used as starting products in the same patent, originated a range of new products, different from those described in said patent and new with respect to the state of the art, as demonstrated unmistakably by the chemical and physical characteristics and especially by the $^{13}$C-NMR spectrum.

The chemical and physical characteristics of the products described in U.S. Pat. No. 5,010,063 and the results of a subsequent structural study described by Jaseia M., Rej R., Sauriol F., Perlin A. S. in Can. J. Chem 67, 1449–56 (1989), with the specific aim of explaining the mechanism of the reaction of structural modification in a basic medium, have demonstrated that these derivatives show a modification which concerns just one of the saccharide units characteristic of glycosaminoglycans with heparin or heparan structure, more specifically the unit of α-L-iduronic acid sulfated in position 2 and involving its transformation into a 2,3-epoxygulonic unit. The so obtained epoxides are represented by the following general formula IV Likewise it has been demonstrated that semi-synthetic glycosaminoglycans with one 2,3-epoxygulonic unit and also glycosaminoglycans with heparin or heparan structure, in conditions of reaction similar to those described in U.S. Pat. No. 5,104,860 undergo a structural modification which also concerns the saccharide unit of α-L-iduronic acid sulfated in position 2 and involving the transformation of this saccharide unit into a unit of non-sulfated α-L-iduronic acid or α-L-galacturonic acid, according to the conditions of reaction used.

So U.S. Pat. No. 5,010,063 describes semi-synthetic glycosaminoglycans containing an epoxy function between positions 2 and 3 of the unit of α-L-iduronic-2-O-sulfate acid taken as a starting point and the conditions of reaction necessary for obtaining them, while U.S. Pat. No. 5,104,860 describes products deriving from further transformation of the epoxide, confirmed as having one unit of non-sulfated α-L-iduronic or α-L-galacturonic acid, and the conditions of reaction necessary for obtaining them starting from the epoxide itself or, as an alternative, starting from the glycosaminoglycans with heparin or heparan structure themselves, used as starting products in U.S. Pat. No. 5,010,063.

Subsequently, in published European patent application EP 565.862, semi-synthetic glycosaminoglycans were described in which one of the saccharide units characteristic of the glycosaminoglycans with heparin or heparan structure, more specifically that containing α-L-iduronic-2-O-sulfate acid, has undergone, entirely or in part, a structural modification with transformation into α-L-galacturonic acid substituted with a nucleophilic radical in position 3. The process claimed in said published European patent application describes the obtaining of the semi-synthetic glycosaminoglycans of general formula III by the glycosaminoglycan of formula I according to the process described in U.S. Pat. No. 5,010,063. The advantage of directly obtaining the product of formula III in only one reaction by starting from the glycosaminoglycan of formula I instead of obtaining it by means of two consecutive reactions, the first of which includes the process of synthesis, isolation and purification of the epoxide of formula IV starting from the glycosaminoglycan of formula I, is evident in terms of overall yield and of industrial cost.

To better define the field of the present invention, we would like to point out that the expression glycosaminoglycans with heparin or heparan structure is intended to indicate polysaccharides with a molecular weight of between about 3000 and about 50000 Daltons and characterized by the fact of possessing a disaccharide unit

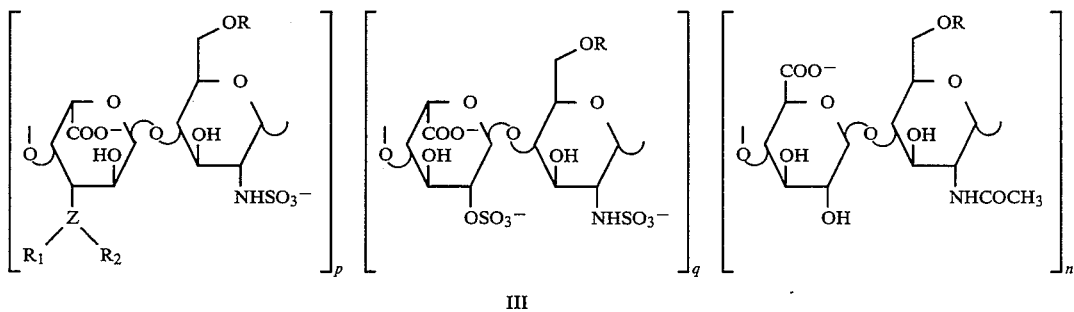

III by treating the epoxides of formula IV, described in U.S. Pat. No. 5,010,063, with a nucleophilic reagent.

Object of the present invention is a new process for the preparation of the semi-synthetic glycosaminoglycans of general formula III directly starting from the glycosaminoglycans with heparin or heparan structure of general formula I consisting of a uronic acid (which may be α-L-iduronic or β-D-glucuronic) and of α-D-glucosamine, connected, in alternate sequences, by 1,4-glycosidic bonds as described by Gallagher J. T. and Walker A. in Biochem. J., 230, 665–674, (1985), Lindhal U., Kjellen L. in Thrombosis and Haemostasis 66, 44–48 (1991) and by Turnbull J. E., Gallagher J. T. in Biochem. J. 273,

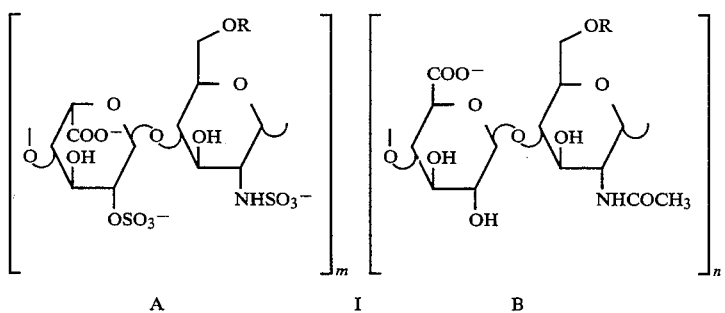

A    I    B

The configuration of the uronic residue different from that of the glycosaminoglycans with heparin or heparan structure was determined on the basis of the chemical physical data, particularly on the basis of the $^{13}$C-NMR spectrum.

This new process represents an improvement of the process described in the published European patent application EP 565.862 because it uses as starting product the glycosaminoglycan of formula I, while in said European patent application the starting material was the epoxy derivative of formula IV in its turn obtained 553–559 (1991). Since the α-L-iduronic acid can be sulfated in position 2 and the glucosamine can be N-acetylated, N-sulfated, 6-O-sulfated, 3-O-sulfated, according to the variable positions of the substituents, at least 10 different disaccharide units are possible, whose combination may generate a large number of different sequences. Bearing in mind the most represented disaccharide units and the most frequent sequences, we can say with reasonable approximation, that the general formula I can be attributed to glycosaminoglycans with heparin or heparan structure

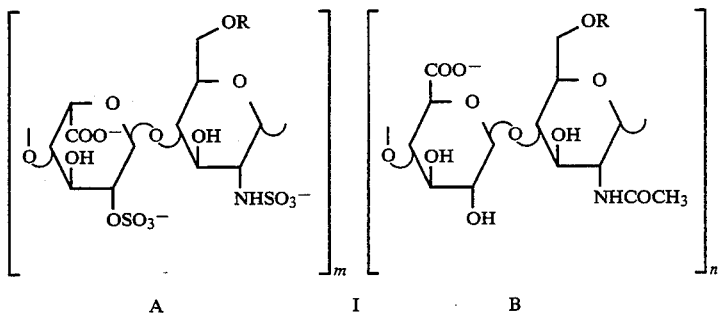

where R represents hydrogen or the sulfate residue (SO$_3^-$) and where m and n are whole numbers between 1 and 100.

In heparin structured glycosaminoglycans of natural origin the value of m is high and the disaccharide unit A represents about 80% of the disaccharide units: on the contrary, in heparan structured glycosaminoglycans of natural origin the value of n is high and the disaccharide unit B represents about 80% of the disaccharide units.

The general formulae I and III are intended to reveal the composition of the main saccharide units but make no reference to their sequence. As is known to experts in the art, it is possible to make a chemical modification of glycosaminoglycans of natural origin, for example through reactions of N-desulfatation, possibly followed by reactions of N-acetylation, thus also obtaining semi-synthetic N-desulfated heparins or N-desulfated-N-acetylated heparins. In addition, these glycosaminoglycans, whether natural or semi-synthetic, may be subjected to depolymerization processes by means of which the molecular weight is taken to levels generally between 3000 and 10000 Daltons.

The structural modification described in this invention for obtaining new semi-synthetic glycosaminoglycans involves the partial or total transformation of the saccharide unit of α-L-iduronic-2-O-sulfate acid into a saccharide unit of α-L-galacturonic acid substituted by a nucleophilic radical in position 3, with the subsequent disappearance of the heparin or heparan structure. This structural modification can be done on any type of compound with heparin or heparan structure. Indeed, besides being selective, the chemical process described in this invention can be applied to glycosaminoglycans with heparin or heparan structure which present all the possible sequences; i.e. it is independent of the type and of the level of functionalization of the saccharide unit which precedes or follows in the sequence the unit of α-L-iduronic-2-O-sulfate acid which is the object of the reaction of structural modification.

The structure of the new products is represented by the general formula III

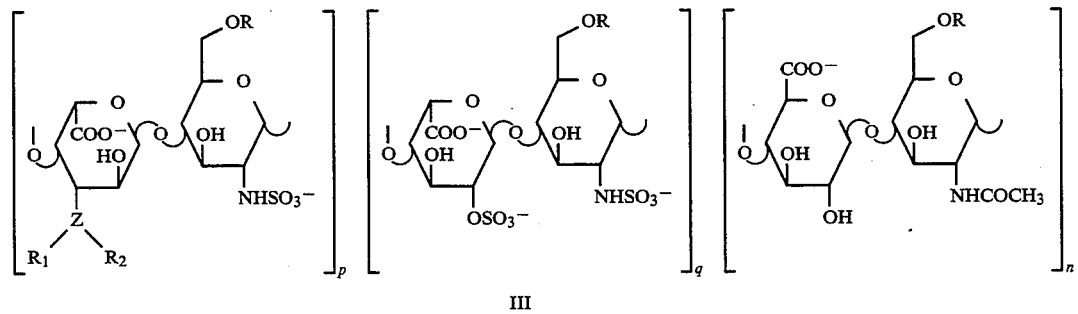

III where p+q=m, with p other than 0, and m, n and R have the meaning as seen above, and where —Z(R$_2$)R$_1$ represents the nucleophilic group introduced through the process described in this invention.

The reaction of structural modification which involves the modification from saccharide unit of α-L-iduronic-2-O-sulfate acid into saccharide unit of α-L-galacturonic acid, with the introduction of the nucleophilic radical in position 3 of the α-L-galacturonic acid, does not lead to the depolymerization of the glycosaminoglycans or alteration in the distribution of the molecular weight of the polysaccharide chains which form them, and for this reason the present reaction can be applied to glycosaminoglycans with heparin or heparan structure of any molecular weight. The products obtained can however be subjected to the known processes of chemical or enzymatic depolymerization.

DETAILED DESCRIPTION OF THE INVENTION

The object of the present invention is to provide a new process for obtaining semi-synthetic glycosaminoglycans in which one of the saccharide units characteristic of glycosaminoglycans with heparin or heparan structure of general formula I

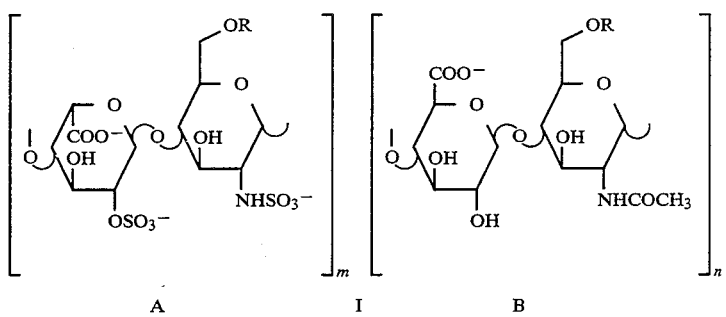

in which R represents hydrogen or the sulfate residue (SO₃⁻) and m and n are whole numbers with values between 1 and 100, has undergone a structural modification with partial or total transformation of the α-L-iduronic-2-O-sulfate acid to α-L-galacturonic acid substituted in position 3 by a nucleophilic radical of general formula II

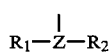

II with formation of new semi-synthetic glycosaminoglycans of general formula III

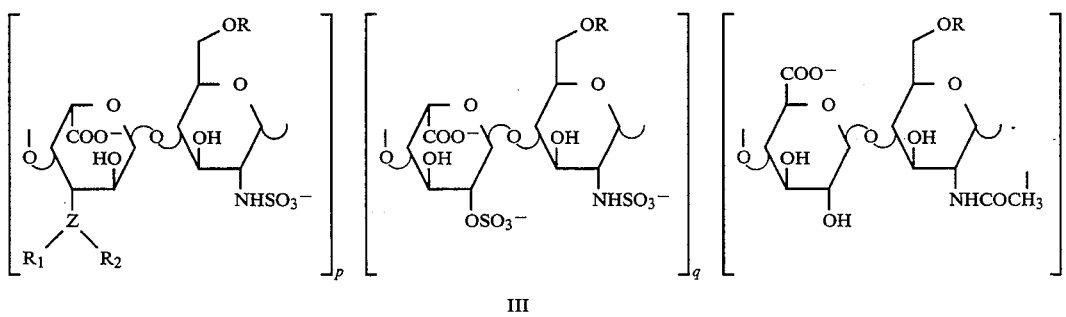

III where p+q=m, with p other than 0, and m, n and R have the meaning defined above.

All the nucleophilic reagents may be used to advantage in carrying out this invention and in fact the radical —Z(R₂)R₁ includes any type of nucleophilic reagent.

More specifically, Z represents oxygen, sulphur or nitrogen, R₁ represents the straight diazo or hydroxyl (C₁₋₁₂) alkyl, or branched C₃–C₁₂ alkyl, amino, aromatic groups, substituted or not substituted, and R₂ is absent or hydrogen or a straight C₁–C₆ alkyl or branched C₃–C₆ alkyl groups, or taken with R₁ forms a heterocyclic ring.

The radicals deriving from primary or secondary amines, secondary heterocyclical amines, aminoalcohols, aminothiols, amino acids, aminoesters, peptides, alcohols, phenols, mercaptans, dithiols, thiophenols, hydroxylamines, hydrazincs, hydrazides and sodium azide are preferred in performing the present invention.

Particularly preferable in performing this present invention are the radicals—Z(R₂)R₁ originating from the following nucleophilic reagents: glycine, glycylglycine, L-cysteine, acetyl-L-cysteine, L-cysteine ethyl ester, 2-aminothiophenol, 1,3-propandithiol, cysteamine, sodium azide, 2-aminoethyl bisulfate, taurine, thioglycolic acid, β-alanine ethyl ester, L-cystine, hydroxylamine, glycyltaurine, cysteinyltaurine, glycylcysteine, glycylphenylalanine, glycyltyrosine, 2-aminoethanol, glycine ester with 2-aminoethanol, glycine amide with 2-aminoethanol, arginyllysine, arginine, lysine, 2-aminoethanol ester with acetic acid, salicylic acid, methionine, glycylproline, γ-aminobutyric acid, lysylprolylarginine, threonyllysylproline, threonyllysine, prolylarginine, lysylproline, choline, 4-(3-aminopropyl)-2-hydroxybenzoic acid and 4-(2-aminoethyl)-2-hydroxybenzoic acid.

The process for obtaining semi-synthetic glycosaminoglycans of general formula III involves reacting a glycosaminoglycan with heparin or heparan structure of general formula I with a nucleophilic reagent whose radical is included in the general formula II, in aqueous solution and in the presence of a quantity of inorganic or organic base able to salify any acid groups present in the nucleophilic reagents and/or to free the same nucleophilic reagents from any salts they may have with substances of an acid nature and to generate such an excess of alkalinity that the reaction mixture is between 0.5 and 6N as regards the base used, preferably from 1 to 3N. The reaction is done by adding the glycosaminoglycan of formula I, in a quantity comprised between 1% and 5% with respect to the end volume of the solution, to an aqueous solution containing the nucleophilic reagent and the inorganic or organic base; the same nucleophilic reagent can act as a base when it is a strong base.

The quantity of nucleophilic agent is comprised between 1 and 200 molar equivalents, preferably between 10 and 100 molar equivalents, with respect to the dimeric unit of the glycosaminoglycan of formula I. Alkaline or alkaline-earth hydroxides, preferably sodium or potassium hydroxide, are used as inorganic bases, while tertiary amines like triethylamine are the organic bases preferably used.

The reaction mixture is kept under stirring, possibly in an atmosphere of inert gases, preferably nitrogen, where the nucleophilic reagent is easily oxidizable, at a temperature of between 45° C. and 95° C., preferably between 50° C. and 70° C., for a period of time of between 30 minutes and 24 hours, preferably between 2 and 6 hours.

At the end of the reaction, after cooling, the reaction mixture is given a neutral pH by adding an aqueous solution of hydrochloric acid. The excess of nucleophilic reagent may optionally be removed, for example through extraction with a solvent which is not miscible with water, with chloroform or diethyl ether, or through filtration where it is not soluble in aqueous medium with neutral pH. The clear aqueous solution may be further purified at a later stage through dialysis, cut off 3000 Daltons, first in running water and then in distilled water. Finally the semi-synthetic glycosaminoglycan of general formula III is isolated through lyophilization of the aqueous solution which contains it or through precipitation on addition of a suitable solvent.

The examples below are a further illustration of the invention but they must not be taken as a limitation of the invention itself.

EXAMPLE 1

Semi-synthetic glycosaminoglycan of general formula III in which $-Z(R_2)R_1$ corresponds to glycyl 400 Milligrams of heparin sodium salt are added to 20 ml of an aqueous solution containing 4500 mg of glycine and 4000 mg of sodium hydroxide, thermostated at 60° C. The reaction mixture is kept under stirring at 60° C. for 3 hours, is then cooled to room temperature and the pH is neutralized through the addition of a diluted aqueous solution of hydrochloric acid. The solution is then subjected to dialysis, cut off 3000 Daltons, for 12 hours in running water and for 6 hours in distilled water and is finally lyophilized obtaining 380 mg of product.

EXAMPLE 2

Semi-synthetic glycosaminoglycan of general formula III in which $-Z(R_2)R_1$ corresponds to taurinyl.

The reaction is performed in the same conditions as described in example 1 using 3750 mg of taurine instead of 4500 mg of glycine and obtaining 400 mg of product.

EXAMPLE 3

Semi-synthetic glycosaminogycan of general formula III in which $-Z(R_2)R_1$ corresponds to 1-amino-3-carboxypropane.

The reaction is performed in the same conditions as described in example 1 using 6200 mg of 4-aminobutanoic acid instead of 4500 mg of glycine and 3200 mg of sodium hydroxide instead of 4000 mg and extending the time of reaction to 4 hours. 390 Mg of product are obtained.

We claim:

1. A process for the synthesis of a product glycosaminoglycan having the formula

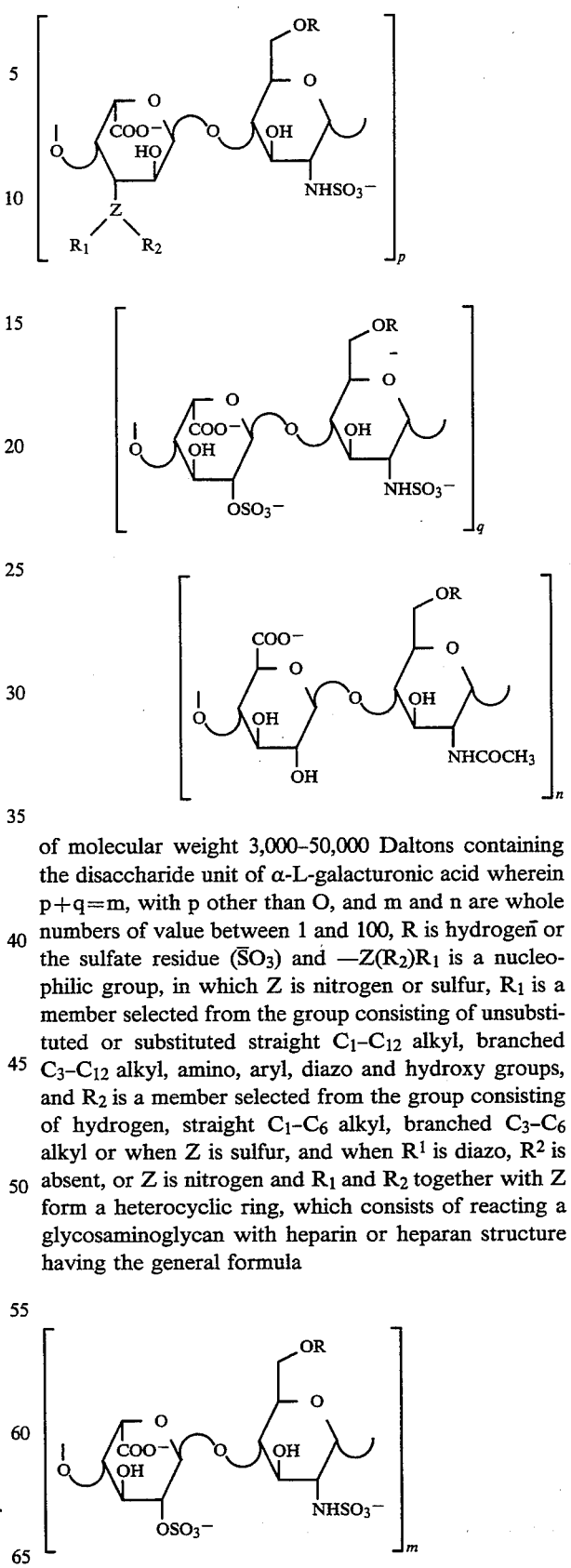

of molecular weight 3,000–50,000 Daltons containing the disaccharide unit of α-L-galacturonic acid wherein p+q=m, with p other than O, and m and n are whole numbers of value between 1 and 100, R is hydrogen or the sulfate residue ($\overline{S}O_3$) and $-Z(R_2)R_1$ is a nucleophilic group, in which Z is nitrogen or sulfur, $R_1$ is a member selected from the group consisting of unsubstituted or substituted straight $C_1-C_{12}$ alkyl, branched $C_3-C_{12}$ alkyl, amino, aryl, diazo and hydroxy groups, and $R_2$ is a member selected from the group consisting of hydrogen, straight $C_1-C_6$ alkyl, branched $C_3-C_6$ alkyl or when Z is sulfur, and when $R^1$ is diazo, $R^2$ is absent, or Z is nitrogen and $R_1$ and $R_2$ together with Z form a heterocyclic ring, which consists of reacting a glycosaminoglycan with heparin or heparan structure having the general formula

A

-continued

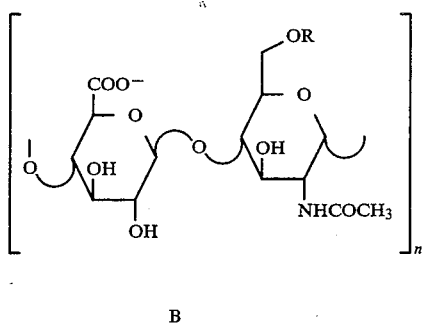

B wherein m and n have the same meaning as hereinabove with from 1 to 200 molar equivalents, with respect to the disaccharide unit of the glycosaminoglycan with heparin or heparan structure, of a a) a nucleophilic reagent containing said group

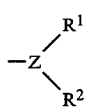

b) or a salt of said nucleophilic reagent, in an aqueous solution and an amount of inorganic or organic base to generate excess alkalinity between 1 and 6N and when the reaction is carried out with a salt of said nucleophilic reagent also sufficient to release said nucleophilic reagent from said salt and when said $R_1$ is substituted by an acidic group also sufficient to neutralize said acidic group, keeping the reaction mixture under stirring for a period of time between 2 and 6 hours at a temperature of between 50° C. and 95° C., then cooling, adjusting the pH of said aqueous solution to neutrality by addition of an aqueous solution of hydrochloric acid, subjecting said aqueous solution to dialysis, first with tap water and then with distilled water and isolating said product glycosaminoglycan by lyophilization of said aqueous solution, said product glycosaminoglycan being free of depolymerization with respect to said glycosaminoglycan with heparin or heparan structure.

2. The process according to claim 1 wherein the quantity of nucleophilic reagent is between 10 and 100 molar equivalents with respect to said disaccharide of the glycosaminoglycan with heparin or heparan structure and the concentration of said glycosaminoglycan with heparin or heparan structure in said aqueous solution is between 1% and 5%.

3. The process according to claim 1 wherein the base is sodium hydroxide, potassium hydroxide or triethylamine and the excess of alkalinity is such that the reaction mixture is up to 3N with respect to the base used.

4. The process according to claim 1 wherein said nucleophilic reagent is a member selected from the group consisting of primary amines, secondary amines, secondary heterocyclic amines, aminoalcohols, aminothiols, aminoacids, aminoesters, peptides, alcohols, phenols, mercaptans, dithiols, thiophenols, hydroxylamines, hydrazines, hydrazides and sodium azide.

5. The process according to claim 4 wherein the mucleophilic reagent is glycine, glycylglycine, L-cysteine, acetyl-L-cysteine, L-cysteine ethyl ester, 2-aminothiophenol, 1,3-propandithiol, cysteamine, sodium azide, 2-aminoethyl bisulfate, taurine, thioglycolic acid, B-alanine ethyl ester, L-cystine, hydroxylamine, glycyltaurine, cysteinyltaurine, glycylcysteine, glycylphenylalanine, glycyltyrosine, 2-aminoethanol, glycine 2-aminoethyl ester, glycine 2-hydroxyethyl amide, argi-nyllysine, arginine, lysine, acetic acid 2-amino ethyl ester, salicylic acid, methionine, glycylproline, γ-aminobutyric acid, lysylprolylarginine, threonyllysylproline, threonyllysine, prolylarginine, lysylproline, choline, 4-(3-aminopropyl)-2-hydroxybenzoic acid and 4-(2-aminoethyl)-2-hydroxybenzoic acid.

6. The process according to claim 5 wherein the sodium salt of heparin is reacted with glycine and the product has the formula

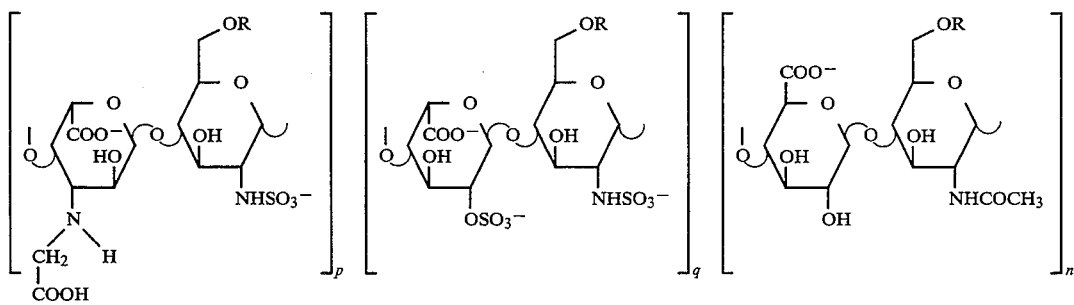

7. The process according to claim 5 wherein the sodium salt of heparin is reacted with taurine and the product has the formula

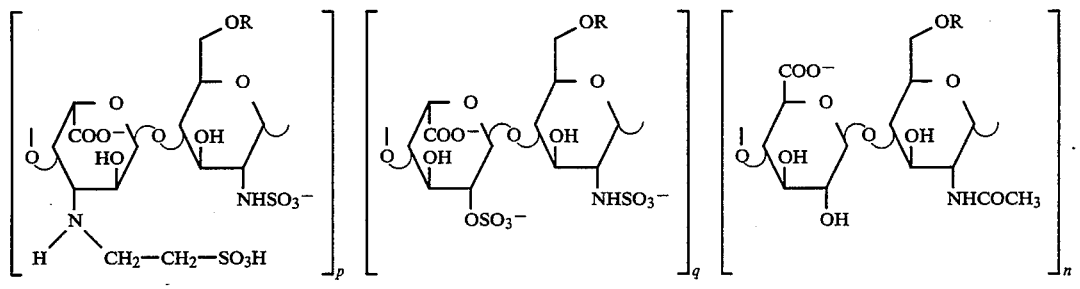
8. The process according to claim 5 wherein the sodium salt of heparin is reacted with 4-aminobutanoic acid and the product has the formula
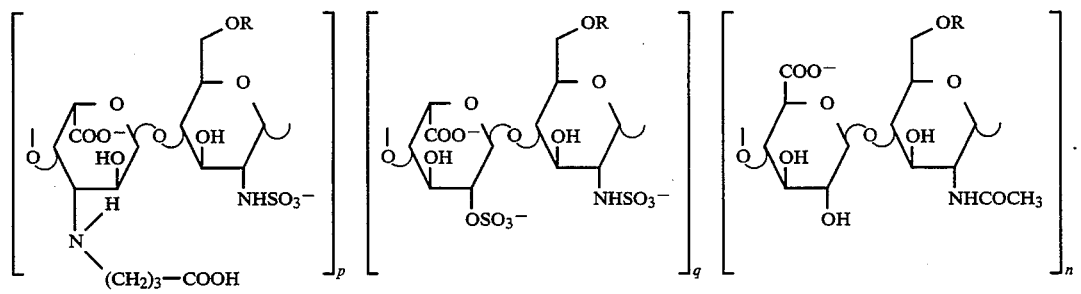
* * * * *